United States Patent [19]
Endersen

[11] 3,950,043
[45] Apr. 13, 1976

[54] SUPPORT OF ROTARY DRUMS SUCH AS KILNS

[75] Inventor: William Christian Endersen, Copenhagen Valby, Denmark

[73] Assignee: F. L. Smidth & Co., Cresskill, N.J.

[22] Filed: Dec. 17, 1973

[21] Appl. No.: 425,292

[30] Foreign Application Priority Data
Dec. 18, 1972 United Kingdom............... 58375/72

[52] U.S. Cl................................. 308/15; 308/204
[51] Int. Cl.$^2$......................................... F16C 13/04
[58] Field of Search ............... 308/15, 25, 203, 204

[56] References Cited
UNITED STATES PATENTS

| 157,599 | 12/1874 | Hall .................................... 308/203 |
| 1,642,834 | 9/1927 | Yeomans .............................. 308/203 |
| 2,551,774 | 5/1951 | Traylor, Jr. .......................... 308/15 |
| 2,858,177 | 10/1958 | Birdsall ............................... 308/203 |

Primary Examiner—John J. Love
Assistant Examiner—Robert Saifer
Attorney, Agent, or Firm—Pennie & Edmonds

[57] ABSTRACT

This invention relates to arrangements for supporting rotary drums such as tube mills and rotary kilns of the type which rotate about a horizontal or slightly inclined axis and are provided with at least one running surface on the circumferential surface thereof and corresponding with one or more supporting means for supporting the drum on a foundation. The supporting means is mounted on the foundation and an endless member is positioned on the supporting means with the running surface of the drum in contacting relation with the endless member such that part of the weight of the drum is thereby transmitted to the supporting means. The endless member follows an endless path substantially perpendicular to the axis of the drum while moving in running contact with the corresponding running surface of the drum during rotation thereof. The running surface may be a belt-like, machined surface of the drum proper, but it is preferably a special, machined live ring encircling the drum.

6 Claims, 8 Drawing Figures

U.S. Patent  April 13, 1976  Sheet 1 of 2  3,950,043
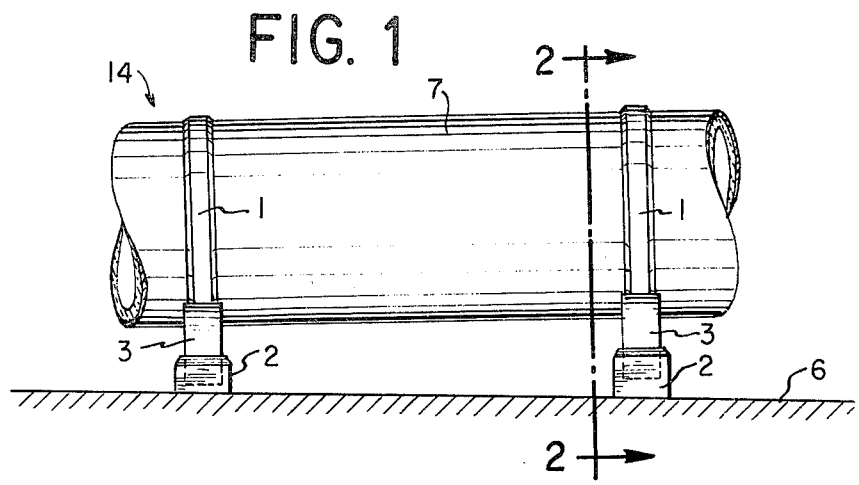
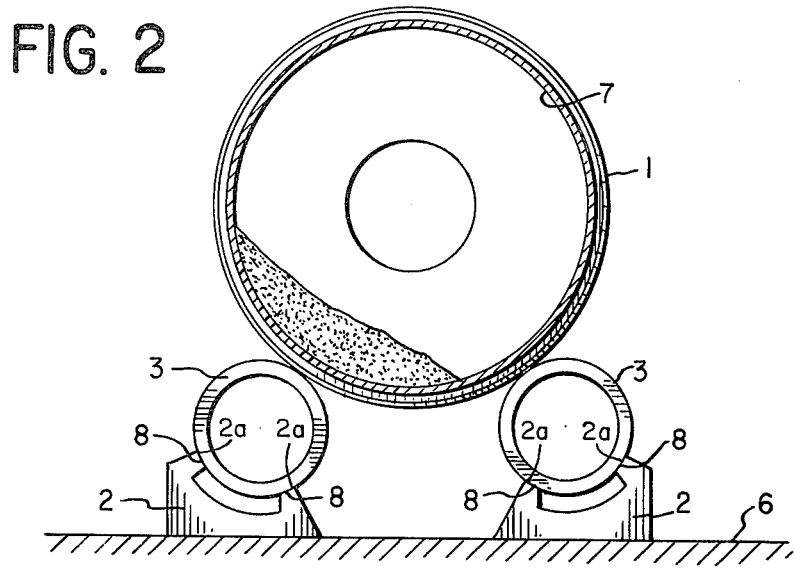
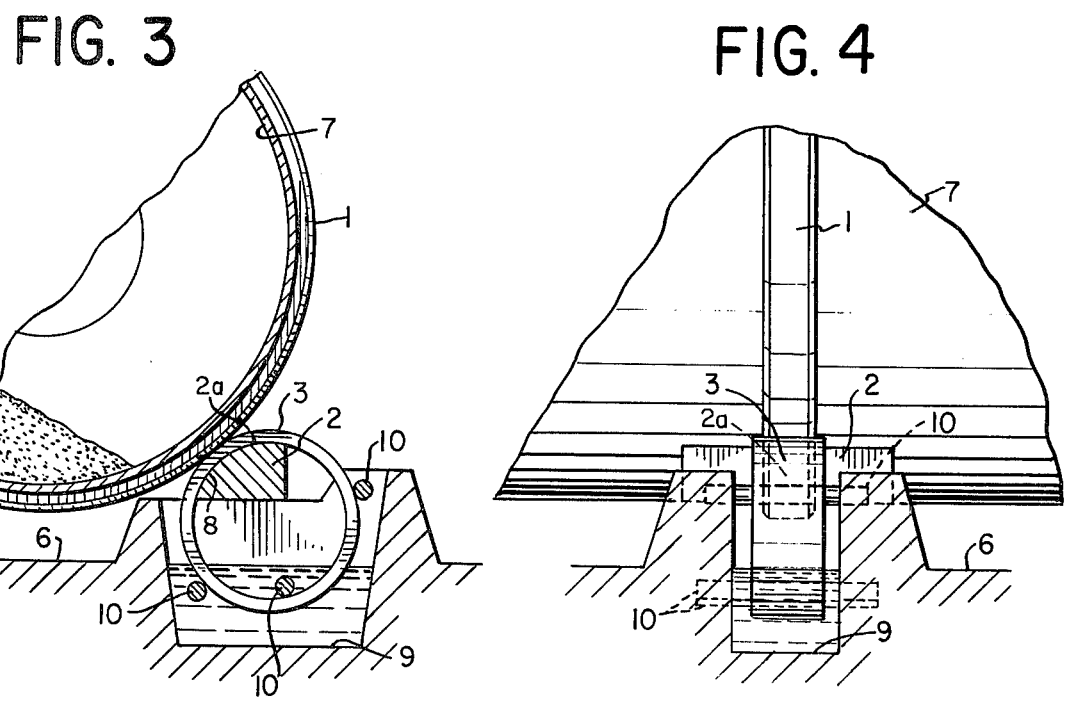

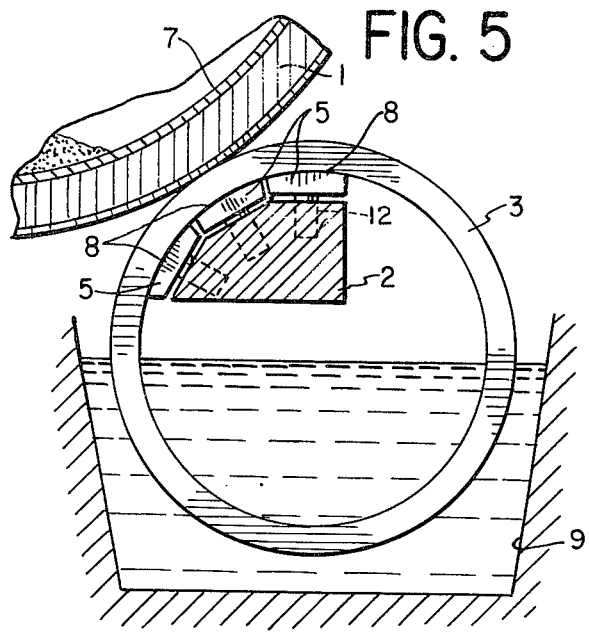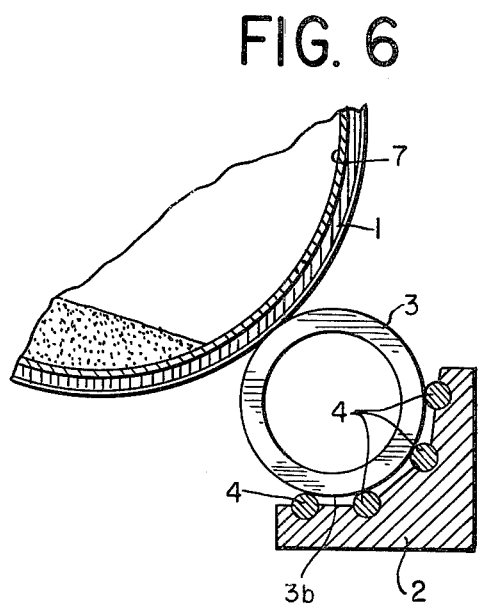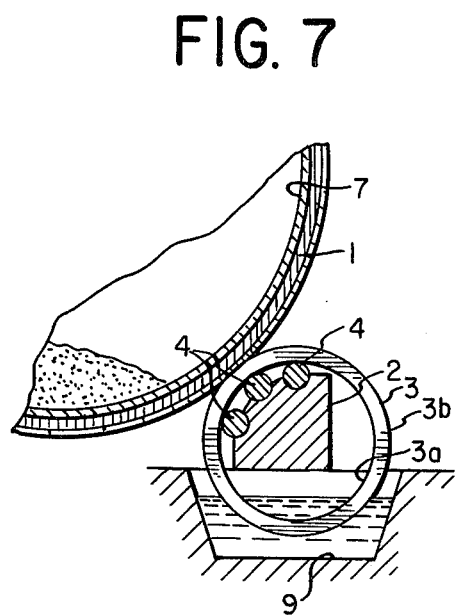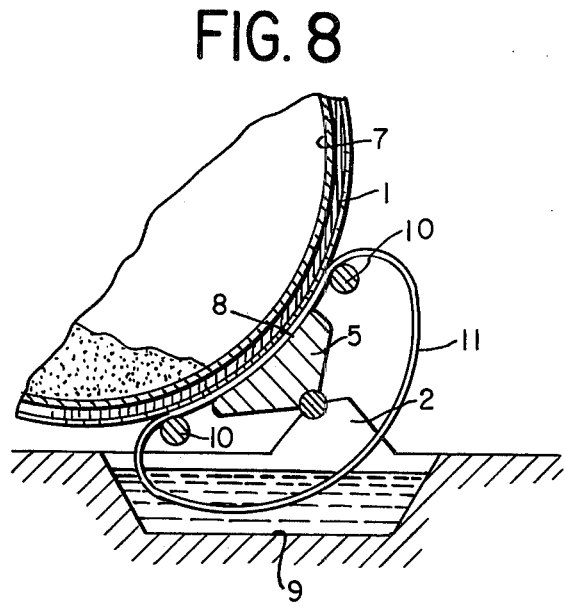

SUPPORT OF ROTARY DRUMS SUCH AS KILNS

BACKGROUND OF THE INVENTION

1. Field of the Invention

This invention relates to arrangements for supporting drums. In particular, the invention relates to arrangements for supporting drums such as rotary kilns, tube mills and the like.

2. Description of the Prior Art

Tube mills are generally supported by ring-like members known in the art as "live rings." Certain arrangements may include one ring near each end of the drum with each cooperating with two corresponding supports. Another arrangement utilizes a single live ring with two supports at one end, the other end being supported by means of a mill trunnion resting in a bearing.

Rotary kilns, like tube mills, may be supported by means of a live ring at both ends, but as a rule their length in relation to their diameter is so great that they have to be supported at several points. For example, in some arrangements live rings have been positioned at from three to six positions along the drum. In addition, it can be seen that the rotary kiln is further distinguished from the tube mill in that the temperatures occurring in the kiln are higher than those existing in the tube mill. Thus, temperature dissipation is not as critical in the tube mill.

Each support corresponding with a live ring or other running surface may be either stationary or movable. An example of a stationary support is the type known as "slide shoe." The movable type is usually in the form of one or more rollers. Both types of support arrangements have associated disadvantages which are substantially avoided by my invention.

One disadvantage is concerned with lubrication and occurs particularly where the live ring rotates in slide shoes. The temperature of the drum and, consequently, of the live ring may be so high that the lubricating ability of the oil is reduced or even destroyed. When the drum is a rotary kiln this problem has become of increasing importance. In particular, in recent years, due to increased kiln dimensions the temperatures of the kiln shell and, consequently, of the live ring have been reaching a higher level than previously experienced. In addition, where live rings cooperate with slide shoes a careful surface finish is required. Thus, the live ring and its cooperating slide shoes must, therefore, be effectively protected against accumulating dust and impurities. This problem has resulted in the provision of extensive casing with sealing means surrounding the live ring and the adjacent drum section, as well as the supports. The necessity for such additional casing particularly emphasizes the disadvantages of the arrangements of the prior art.

Where rollers are used instead of slide shoes, an effective lubrication between the roller and live ring may be difficult to provide owing to the high temperature of the live ring. This is particularly so in the case of rotary kilns because of the higher temperatures occurring in these "drums" as previously mentioned. Because of the increasing kiln dimensions which have resulted in these supporting rollers becoming of such large dimensions, it is clearly desirable to find other solutions than these traditional, heavy constructions. In addition, the heavy supporting rollers now being used present constructional problems such as shrinking of the journals into the rollers, that only few manufacturers are capable of casting the large charge of steel which is generally required in the manufacture of these heavy supporting rollers. Apart from this, there are obvious economic advantages in limiting the consumption of available steel having the high quality required in such supporting rollers. Accordingly, my invention provides a solution which simultaneously relieves, or at least reduces, the three major problems hereinbefore mentioned. The present invention avoids the problems of lubrication, of keeping the dirt and impurities away from the contacting surfaces, and of reducing the weight of the supports, particularly where rollers are utilized.

SUMMARY OF THE INVENTION

According to my invention an arrangement is provided for supporting drums such as tube mills, rotary kilns and the like which are rotatable about a horizontal or a slightly inclined axis and provided on the circumferential surface with at least one running surface for supporting the drum on a foundation. The arrangement comprises at least one supporting means mounted on the foundation, and at least one endless member positioned on the supporting means with the running surface of the drum in contacting relation with the endless member such that at least a part of the weight of the drum is transmitted to the supporting means. The endless member is adapted to follow an endless path substantially perpendicular to the axis of the drum while moving in running contact with the corresponding running surface of the drum during rotation of the drum.

The weight of the kiln is thus taken by the endless member or members and transferred to the supporting member or members which form the supports proper and, in turn, are mounted on the drum foundation. As a result, the supports are only subjected to moderate heating since only very little heat can be transmitted between a live ring and an endless member and between the endless member and the support owing to the relatively small surfaces of contact available.

By this arrangement the invention distinguishes decisively from the present day rotating supports wherein the center-line of the rotating support and the center-line of the bearing of the support are coincident.

An important feature of the invention is in the provision of a very wide scope for the design and arrangement of the support proper. For example, the endless member may consist of either a rigid annular body or a flexible endless band. The supporting member or members may either be in the form of rollers or of slide-surfaces. Furthermore, the supporting member or members may bear against the respective endless member either on the outer periphery of the endless member remote from the drum or on the inner periphery of the endless member close to the drum as will hereinafter be described in greater detail.

A second significant feature of the invention is that since a sealing means is only required to protect the endless member and the associated supporting member or members, the problems relating to sealing against dirt and other accumulations which are detrimental to the proper functioning of the moving surfaces are substantially reduced or avoided. This may be illustrated in comparing a casing required for my invention as opposed to a casing which would seal the entire periphery of the live ring as well as its supporting member or members.

Finally, with respect to the weight problem, the use of an endless member or members according to the invention results in a substantial reduction in weight of the supporting arrangement. Normally, the diameter of the supporting roller is determined by the weight of the kiln and the diameter of the live ring, which together with the increasing kiln dimensions has involved increasing supporting rollers of increasing dimensions. It is therefore an obvious advantage when the heavy supporting roller hitherto used is replaced by a relatively thin-walled endless member as will be described.

As has already been indicated, the configuration of the supporting arrangement according to the invention results in the associated supports only being subjected to moderate heating. This feature results in the consequent improvement as regards the problems of lubrication.

If, notwithstanding the advantages of the present invention, it is found desirable to reduce the heat transmission, this may be achieved by providing means for cooling the endless member as will be described. Such means may consist of, for example, a reservoir which contains cooling and/or lubricating agents into which the endless member dips. Particularly in those cases in which the kiln support is constituted by sliding surfaces (as opposed to rollers), it is desirable for the purpose of lubrication that the temperature of the endless member does not become too high. Supporting the supporting means adjacent to a reservoir and adapting the endless member to pass through a part of the reservoir to contact the medium thus provides for improved operation of the arrangement of my invention.

BRIEF DESCRIPTION OF THE DRAWINGS

Preferred embodiments of the invention are described hereinbelow with reference to the drawings wherein:

FIG. 1 illustrates a part of a rotary kiln positioned on supports through the use of two live rings in accordance with the present invention;

FIG. 2 is a vertical section taken on the line 2—2 of FIG. 1;

FIG. 3 is a partial section showing a modification of the supporting arrangement of the invention;

FIG. 4 is a side view of the supporting arrangement shown in FIG. 3;

FIG. 5 is a partial section of another modification of the supporting arrangement shown in FIG. 3;

FIG. 6 is a partial section of another modification of the supporting arrangement shown in FIG. 2;

FIG. 7 is a partial section of another modification of the supporting arrangement shown in FIG. 3; and FIG. 8 is a partial section of still another modification of the supporting arrangement shown in FIG. 3.

DETAILED DESCRIPTION OF THE PREFERRED EMBODIMENTS

Preferred embodiments are described particularly with respect to kiln drums. However, it should be understood that the invention contemplates such supporting arrangements in connection with other rotating drums such as tube mills and the like.

Referring to FIGS. 1 and 2 there is illustrated a supporting arrangement 14 of a rotary kiln drum 7 fitted with running surfaces in the form of live rings 1 spaced a suitable distance apart. By means of the live rings 1 the weight of the rotary kiln is transferred to endless members in the form of rings 3 resting on supports 2 and rotatable on sliding surfaces 8. The supports 2 are mounted on the kiln foundation 6. The axes of the kiln and the axes of the rings are parallel.

In FIGS. 3 and 4 there is illustrated an example of a supporting arrangement in which the live ring 1 rests on the ring 3 which is carried along its inner surface by the support 2 which, in turn, is mounted on the foundation 6 of the kiln. The sole function of rollers 10 is to guide the ring during its rotation about its axis. A groove 9 provided in the foundation 6 serves as reservoir for a cooling and lubricating agent into which the ring 3 dips as shown. The sliding surface 8 of ring 3 slides on friction surfaces 2a of support 2.

In FIG. 5 slide shoes of suitable material are designated 5; such slide shoes are preferably of the adjustable type as shown, wherein elements 5 may be adjusted toward and away from the support 2 preferably through the agency of the threaded members 12 shown in dotted lines.

In FIG. 6 the ring 3 is inserted between the live ring 1 and rollers 4 resting in supports 2 and thereby replacing the sliding surfaces 8 in the embodiment of the invention shown in FIG. 2. In other words the rollers 4 only contact the ring along such portions of its outer periphery as in a given moment is remote from the drum 7. For example, when each roller 4 supportingly contacts portions of the outer peripheral surface 3b of endless ring 3, which is remote from the kiln 7, as shown, the kiln is in a rotational position relative to its own rotational motion which corresponds to the particular portions of ring 3 contacting the rollers 4 at that given instant. At that time, those portions of the ring 3 are remote from the kiln as can be seen in FIG. 6.

In the embodiment of the invention illustrated in FIG. 7 the ring 3 is also inserted between the live ring 1 and the rollers 4 resting in supports 2 and replacing the sliding surfaces 8 in FIG. 3. However, in this modification of the invention, the said rollers 4 only contact the ring 3 along such portions of its inner periphery 3a as in inner drum. Thus, when the rollers 4 supportingly contact portions of the inner peripheral surface which are closest to the kiln 7, the kiln is in a rotational positon relative to its own rotational path which corresponds to the particular inner surface portions 3a of ring 3 contacting the rollers 4 at that given instant. At that time, those portions of the inner peripheral surface 3a of ring 3 are closest to the kiln as can be seen in FIG. 7.

FIG. 8 shows a modification of the arrangement shown in FIG. 3. The characterizing feature of this embodiment of the invention is that the ring 3 of FIG. 3 is replaced by a flexible steel band 11. Such band 11 may be of any thickness which is suitable, taking into consideration the size of the kiln, the weight supported, the material of the band, etc. For example, a suitable thickness contemplated is approximately 2 mm. This band transfers the weight of the drum to the slide shoe 5 which rests movably in the support 2 and during rotation of the drum passes along the sliding surface 8 while being further supported by the rollers 10.

The band 11 dips into either a cooling or lubricating agent, or both, which is provided in the groove 9. Means (not shown) may be provided for continuously wiping off the lubricant on the outside of the band 11 before it contacts the live ring 1 so as to ensure that sufficient frictional forces are available for making the band 11 follow the live ring 1 completely while the band follows the endless path. The configuration assumed by the band is clearly dependent upon the specific types and relative positions of the supporting means used to support the band.

I claim:

1. An arrangement for supporting a drum such as a tube mill or rotary kiln of the type which is rotatable about a horizontal or slightly inclined axis and provided on its circumference with at least one running surface for supporting the drum on a foundation comprising at least one support member mounted on the foundation, at least one substantially rigid endless annular body member positioned about said support member with the running surface of the drum in contacting relation with outer surface portions of the annular body member, a plurality of slide shoes mounted on said support member in adjacent relation to each other and individually adjustably movable toward and away from the support member to adjustably contact, in supporting slidable relation, the inner peripheral surface portion of said annular body member closest to the drum to provide uniform sliding contact therebetween such that at least a portion of the weight of the drum is uniformly transmitted to said slide shoes while said endless annular member follows an endless rotation path substantially perpendicular to the axis of said drum while rotatably moving in running contacting relation with the corresponding running surface of the drum during rotation thereof.

2. The arrangement for supporting a drum such as a tube mill or rotary kiln according to claim 1 wherein said supporting means is supported adjacent to a reservoir containing at least one of a cooling and lubricating medium, said endless annular body member being adapted to pass through at least a part of said reservoir to contact said medium.

3. The arrangement for supporting a drum such as a tube mill or rotary kiln according to claim 1 wherein at least three of said slide shoes are mounted on said support member.

4. An arrangement for supporting a drum such as a tube mill or rotary kiln of the type which is rotatable about a horizontal or slightly inclined axis and provided on its circumference with at least one running surface for supporting the drum on a foundation comprising at least one slide shoe mounted on the foundation, said slide shoe having an arcuate slide surface, and at least one substantially rigid endless annular body member positioned about said slide shoe with the running surface of the drum in contacting relation with outer surface portions of the annular body member and the arcuate slide surface of said slide shoe in supporting slidable contact with an inner peripheral surface portion of said annular body member closest to the drum, a plurality of rollers positioned about an unsupported portion of said annular body member in engaging relation therewith to guide said endless annular body member as it rotates along an endless path such that at least a portion of the weight of the drum is transmitted to the slide shoe and said endless annular body member follows an endless guided path substantially perpendicular to the axis of the drum while moving in running contact with the corresponding running surface of the drum during rotation thereof.

5. The arrangement for supporting a drum such as a tube mill or rotary kiln according to claim 4 wherein said supporting means is supported adjacent to a reservoir containing at least one of a cooling and lubricating medium, said endless annular body member being adapted to pass through at least a part of said reservoir to contact said medium.

6. An arrangement for supporting a drum such as a tube mill or rotary kiln of the type which is rotatable about a horizontal or slightly inclined axis and provided on its circumference with at least two running surfaces for supporting the drum on a foundation comprising at least four support members mounted on the foundation, one support member positioned for each supporting location, a reservoir associated with each support member containing at least one of a cooling and lubricating medium positioned adjacent said support member at least three slide shoes mounted on each support member in adjacent relation to each other and in a manner such that each shoe may be moved toward and away from the support member such that the space between said slide surface of each slide shoe and the support member may be individually adjusted to facilitate uniform adjustable contacting relation between the slide surface of each slide shoe and an inner peripheral surface portion of an annular body member, at least one substantially rigid endless annular body member positioned about said support member and slide shoes with the running surface of the drum in contacting relation with outer surface portions of the annular body member and the arcuate slide surface of each slide shoe in supporting slidable contacting relation with an inner peripheral surface portion of said annular body member closest to the drum, said endless annular body member being positioned and adapted to pass through at least a portion of said reservoir to contact said medium, and said adjustability of said slide shoes relative to said support member facilitating individually adjustable contacting relation between the slide surface of the slide shoes and the inner peripheral surface portion of said annular body member to provide uniform sliding contact therebetween such that at least a portion of the weight of the drum is uniformly transmitted to said slide shoes and said endless annular member follows an endless rotation path substantially perpendicular to the axis of said drum while rotatably moving in running contacting relation with the corresponding running surface of the drum during rotation thereof.

* * * * *

UNITED STATES PATENT AND TRADEMARK OFFICE
CERTIFICATE OF CORRECTION

PATENT NO. : 3,950,043
DATED : April 13, 1976
INVENTOR(S) : William Christian Endersen It is certified that error appears in the above-identified patent and that said Letters Patent are hereby corrected as shown below:

At Col. 4, line 40, "as in inner drum" should read

-- as in a given moment is close to the drum --.

Signed and Sealed this twenty-ninth Day of June 1976

[SEAL]

Attest:

RUTH C. MASON
*Attesting Officer*

C. MARSHALL DANN
*Commissioner of Patents and Trademarks*